March 5, 1929.  F. A. RUFF  1,704,345
LUGGAGE CARRIER
Filed Aug. 8, 1928
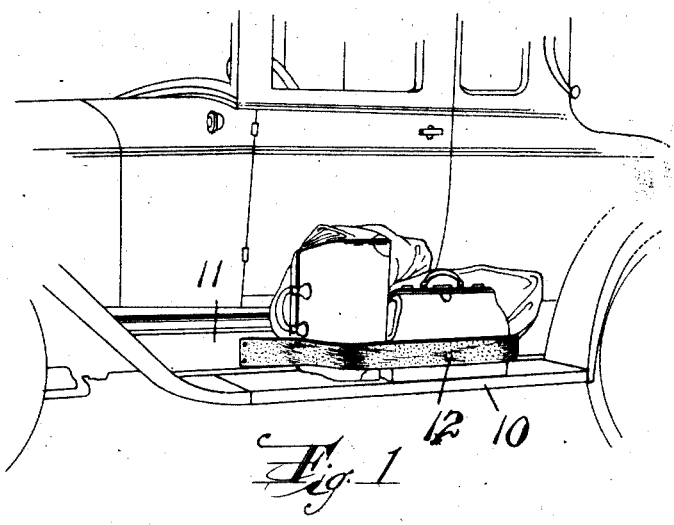
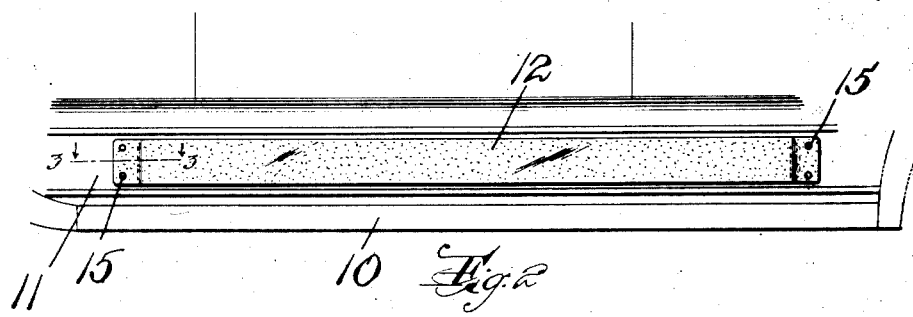
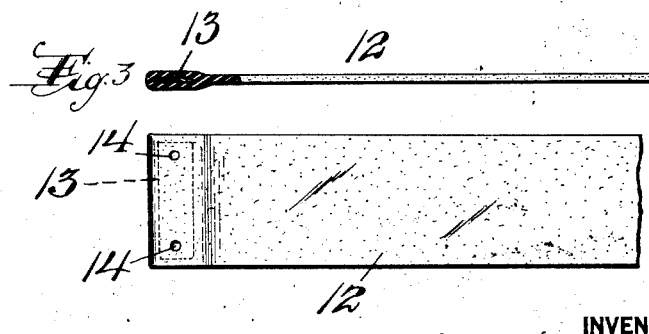
INVENTOR
Frederick A. Ruff,
BY
Wm H Caufield.
ATTORNEY Patented Mar. 5, 1929.

1,704,345

UNITED STATES PATENT OFFICE.

FREDERICK A. RUFF, OF BELLEVILLE, NEW JERSEY.

LUGGAGE CARRIER.

Application filed August 8, 1928. Serial No. 298,168.

This invention relates to an improved luggage carrier for automobiles and is formed by a strip which when retracted rests against the splash board of an automobile which board extends between the mud guards of an automobile and above the step. The strip when extended co-operates with the step to form a luggage carrier by holding whatever luggage is on the step against displacement.

The device is an improvement over the usual forms of rack in that it adapts itself to packages of uneven shape and those that extend beyond the foot-board or step.

The strip which can be extended over the foot-board is also of use in its retracted or flat position as it serves as a kick board or guard which receives the contacts from the toes of shoes of people that step too far forward in entering the car. It thus replaces the ordinary metal plates usually installed for this purpose.

The invention is illustrated in the accompanying drawing in which Figure 1 is a perspective view of a strip extended to hold luggage carried on the step of the automobile. Figure 2 is a side view of a strip when flat against the splash board. Figure 3 is a detail section on line 3—3 in Figure 2 and Figure 4 is a side view of the end of the strip.

The drawing shows one form of strip secured to an automobile and while any form of strip can be secured in a manner to allow its extension over the foot-board I prefer to use an elastic strip, usually one made of a good quality of rubber.

In the illustration I show a foot-board at 10 which supports the baggage or luggage and the splash-board is shown at 11. These parts are the usual ones on an automobile.

The strip is extensible and I show a strip 12, of elastic material which when flat, as in Figure 2, lies against the splash board and forms a kick-board or toe-guard. This protects the paint and prevents denting of the splash-board.

When luggage is placed on the foot-board, as in Figure 1, the strip is extended to embrace the luggage and holds it securely in place. The strip is flexible and thus adapts itself to various shapes of bundles and cases. The luggage can be kept from scratching the car by placing soft packages next to the car or placing a cushion or folded blanket against the car.

The strip if made of elastic, is re-inforced at its ends by vulcanizing a metal plate 13 in the end of the strip and perforating the re-inforced end as at 14 to allow the strip to be secured to the car by the rivets 15.

Various changes can be made in the form and construction of the device without departing from the scope of the invention.

I claim:—

1. A strip secured to the splash-board of an automombile to act as a kick-plate and of flexible material so that the strip can be extended over the step to retain baggage thereon.

2. An elastic strip in combination with a splash-board to which it is secured and a step over which it can be extended to co-operate therewith to form a luggage carrier.

3. The combination of an automobile with an elastic strip secured at its end to the splash-board of the automobile and extensible over the step to form a luggage carrier.

In testimony whereof I affix my signature.

FREDERICK A. RUFF.